US012208540B2

(12) United States Patent
Tarabella

(10) Patent No.: US 12,208,540 B2
(45) Date of Patent: Jan. 28, 2025

(54) HEAD FOR A BRIDGE PROCESSING MACHINE

(71) Applicant: Biesse S.p.A., Chiusa di Ginestreto (IT)

(72) Inventor: Antonio Tarabella, Camaiore (IT)

(73) Assignee: Biesse S.p.A., Chiusa di Ginestreto Pesaro Urbino (IT)

( * ) Notice: Subject to any disclaimer, the term of this patent is extended or adjusted under 35 U.S.C. 154(b) by 321 days.

(21) Appl. No.: 17/944,585

(22) Filed: Sep. 14, 2022

(65) Prior Publication Data

US 2023/0078367 A1 Mar. 16, 2023

(30) Foreign Application Priority Data

Sep. 15, 2021 (IT) ........................ 102021000023786

(51) Int. Cl.
*B28D 1/04* (2006.01)

(52) U.S. Cl.
CPC .................................... *B28D 1/043* (2013.01)

(58) Field of Classification Search
CPC ............. B28D 1/43; B28D 1/04; B28D 7/046
USPC ............................................................ 83/387
See application file for complete search history.

(56) References Cited

U.S. PATENT DOCUMENTS

2018/0104850 A1* 4/2018 Guazzoni ............... B28D 1/003
2020/0078977 A1* 3/2020 Caroselli .................. B26D 9/00
2021/0354331 A1* 11/2021 Motterlini ................ B28D 1/04
2022/0234251 A1* 7/2022 Stangherlin ............ B28D 7/043
2022/0297347 A1* 9/2022 Fontana ................... B28D 7/04
2023/0037698 A1* 2/2023 Mantenuto ............. B28D 7/043
2024/0066757 A1* 2/2024 Medina .................. B28D 7/046

FOREIGN PATENT DOCUMENTS

EP 2253422 A1 11/2010
IT 201800020725 A1 6/2020

OTHER PUBLICATIONS

Italian Search Report dated May 19, 2022. 2 pages.

* cited by examiner

*Primary Examiner* — Omar Flores Sanchez
(74) *Attorney, Agent, or Firm* — RMCK Law Group PLC

(57) ABSTRACT

A head for a bridge processing machine includes a support having a frame loosely connected to a bridge and a shaft extending along a rotation axis and rotatable relative to the frame around the axis, a tool holder assembly supporting a tool to allow processing of an object by the tool and including first constraint means to integrally constrain the tool holder assembly and the shaft, gripping means including a base portion, a gripping device movable relative to the base portion, to define an operating position wherein it engages an object, and an inoperative position, and second constraint means to constrain idly the base portion and the shaft, wherein the gripping means and the tool holder assembly include interface means for blocking reciprocal rotation between the tool holder assembly and the base portion so that the tool holder assembly may drag the gripping means when rotated around the rotation axis.

8 Claims, 3 Drawing Sheets

HEAD FOR A BRIDGE PROCESSING MACHINE

CROSS-REFERENCE TO RELATED APPLICATION

This application claims priority to Italian Patent Application No. 102021000023786 filed Sep. 15, 2021. The disclosure of the above application is incorporated herein by reference in its entirety.

FIELD OF THE INVENTION

The present invention relates to a head for a bridge processing machine of the type specified in the preamble of claim 1.

In particular, the present invention relates to a head for a processing machine, for example, for cutting, configured to allow the processing of blocks, plates or slabs of any material and, more specifically, stone material, such as marble, granite or other similar material. Preferably the head allows plates of stone material to be processed.

DESCRIPTION OF THE PRIOR ART

Bridge processing machines are currently known and, in particular, bridge machines intended for cutting.

Bridge or portal cutting machines, also known as bridge or portal cutting centers are apparatuses equipped with a work table, a support bridge, a moving member and a head comprising a tool holder assembly, for example, a cutter, a circular blade, a laser or other cutting device.

The work table substantially defines the plane on which the objects to be cut are placed, for example, blocks, plates, slabs or other. The support bridge generally comprises a beam element loosely connected to side walls or also to structures resting on the ground, for example, provided with rails, on which the work head is loosely connected.

The moving member, therefore, allows the control of the relative movement between head and bridge and, moreover, also between bridge and walls or support structure.

Generally, the movement of the head is allowed along a direction perpendicular to the direction of relative movement between the bridge and the walls or structure.

In this way, the head may be easily carried into any position of the plane defined by the work table. Of course, the moving member may also be configured, and often it is, to also allow relative rotations between head and bridge.

The head is also equipped with a support portion and a tool holder assembly. The support portion is substantially configured to be moved by the moving member, as previously explained.

The tool holder assembly is loosely bound to the support portion, and configured to translate and rotate with respect to an axis perpendicular to the work surface as well as the relative direction of movement between head and bridge.

Movement of the object on the work surface is generally obtained by means of overhead cranes or forklifts independent of the processing machine.

Forklifts are, therefore, often equipped with gripping means, for example, suction cups, for gripping objects.

Alternatively, the gripping means may be part of a manipulator assembly loosely bound to the bridge and movable along a predetermined direction by means of an autonomous moving member.

The prior art described has some important drawbacks.

In particular, the fact of having to adopt an overhead crane or an independent moving member with respect to the tool holder assembly makes the machine more bulky, more complex and, therefore, burdensome from every point of view.

To overcome these drawbacks, a machine has been produced, described in the patent EP-B-2571651, and comprising a head wherein the gripping means are substantially integral with the tool holder assembly.

In particular, the gripping means are rotatable between an operating position, in which they are arranged in proximity to the work surface, and a non-operative position, in which they are substantially removed from the work surface. This characteristic allows using the same moving member for moving the tool and gripping means.

In addition, the fact of having to consider just a single moving member allows the control unit to control the positions of the tool holder assembly and the gripping means with respect to a single coordinate system, avoiding the correlation of different reference systems with obvious simplifications in the operation of the machine.

However, even the aforesaid machine has some important drawbacks. In particular, the movement and processing operations are particularly slow and, in particular, in the transition from one operation to another, at least the positioning time of the gripping means or of the tool must always elapse.

In addition, the fact of having to switch the operating mode of the terminal of the head, on which the cutting means and the tool are mounted together, entails the need to repeatedly move the terminal with respect to the support portion of the head, with obvious problems regarding the duration and integrity of the terminal.

Another drawback is given by the complexity of known machines. In particular, this aspect is accentuated in that the components of the various transmission kinematics are subject to heavy loads that cause significant wear and high risk of faults. This aspect is accentuated in that the gripping means tend to get dirty quickly, deteriorating the gripping capabilities.

OBJECT AND SUMMARY OF THE INVENTION

In this situation, the technical task underlying the present invention is to design a head for a bridge processing machine capable of substantially overcoming at least part of the aforementioned drawbacks.

Within the scope of said technical task, an important object of the invention is to obtain a head for a bridge processing machine that allows reduction of the complexity of the machine, not requiring a plurality of independent moving members for gripping and processing means.

Another important object of the invention is to produce a head for a bridge processing machine which, in the face of reduced complexity, is subject to reduced wear and a lower risk of breakage.

Furthermore, an important object of the invention is to reduce the number of components involved in the movement, when the object is required to be moved with respect to the processing table.

The technical task and the specified objects are achieved by a head for a bridge processing machine as claimed in the attached claim 1.

Preferred technical solutions are highlighted in the dependent claims.

BRIEF DESCRIPTION OF THE DRAWINGS

The characteristics and advantages of the invention are clarified below by the detailed description of preferred embodiments of the invention, with reference to the attached drawings, in which.

DETAILED DESCRIPTION

Figure 1:
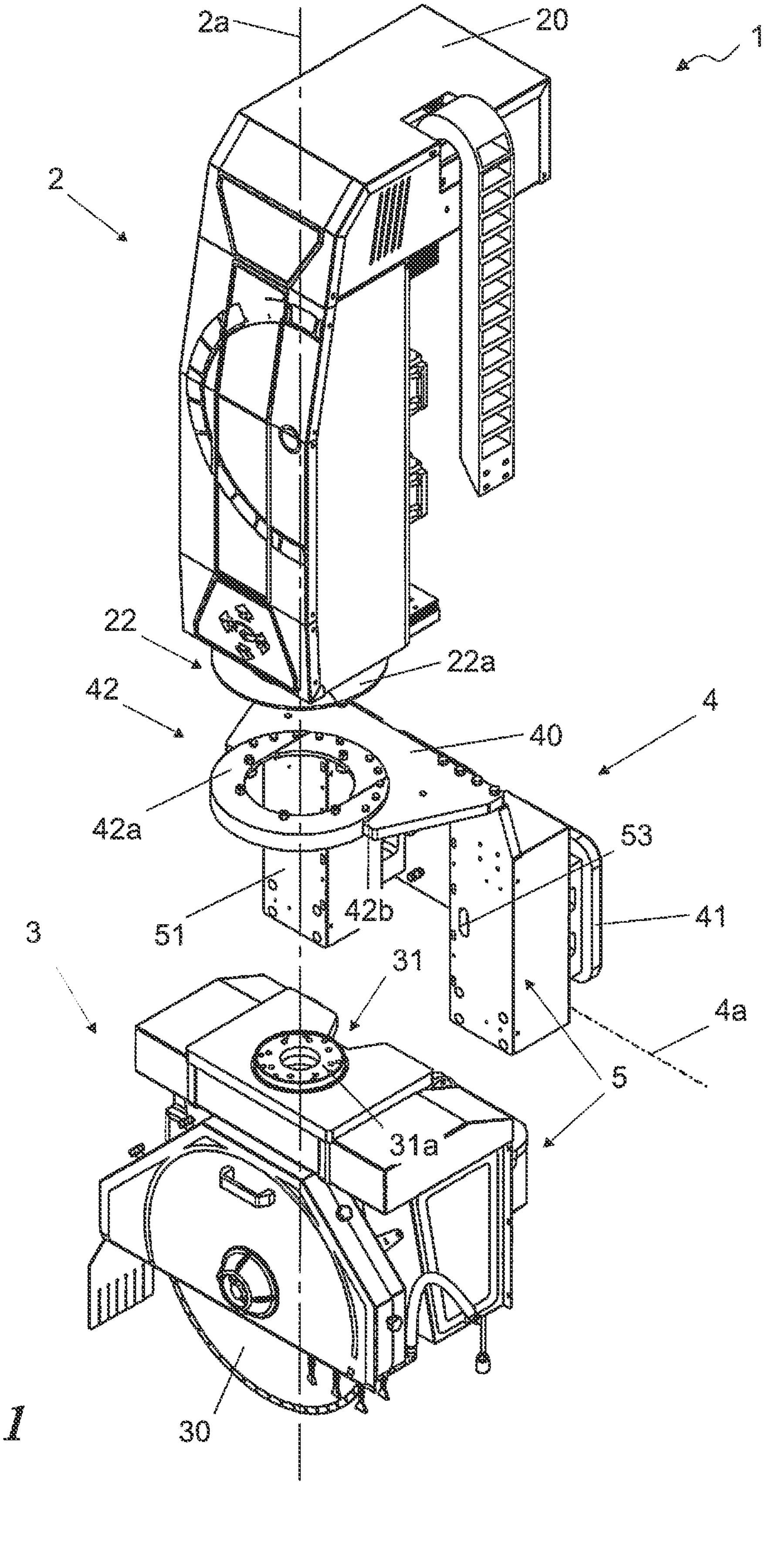
FIG. 1 shows an exploded perspective view of a head for a bridge processing machine according to the invention.
Figure 2:
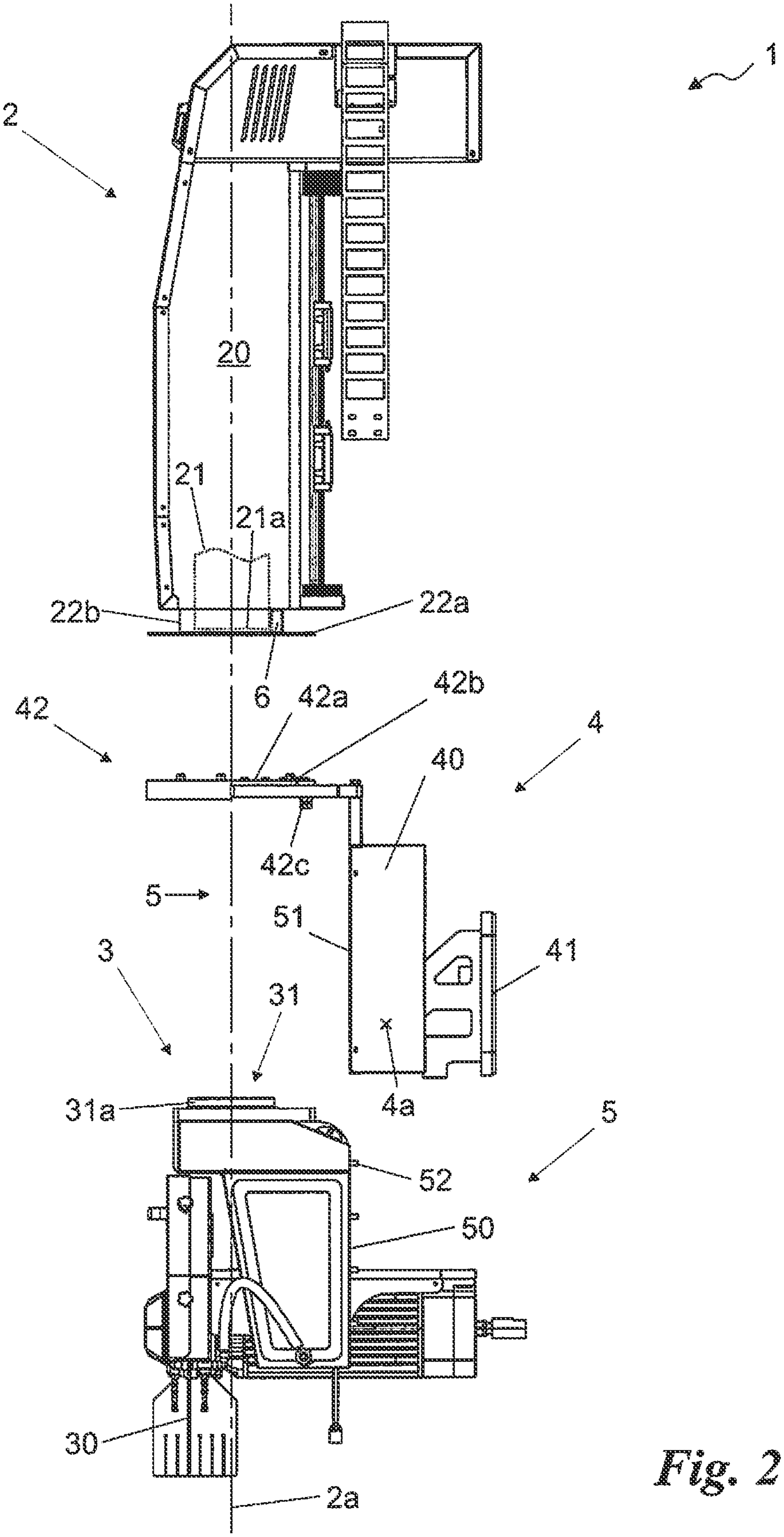
FIG. 2 illustrates an exploded side view of a head for a bride processing machine according to the invention.
Figure 3:
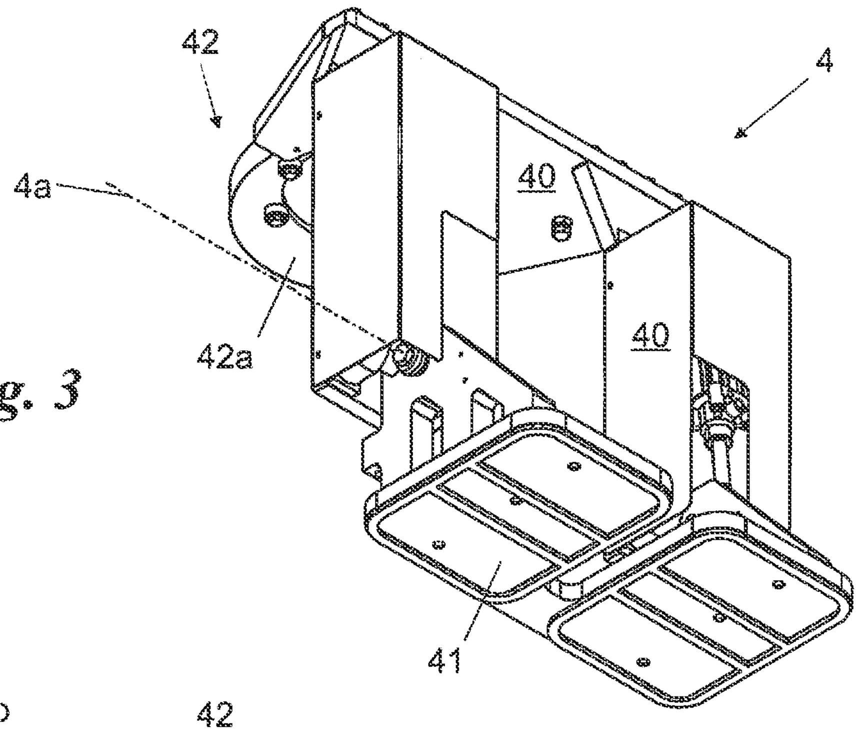
FIG. 3 is a perspective view from below of the gripping means of a head for bridge processing machines according to the invention.
Figure 4:
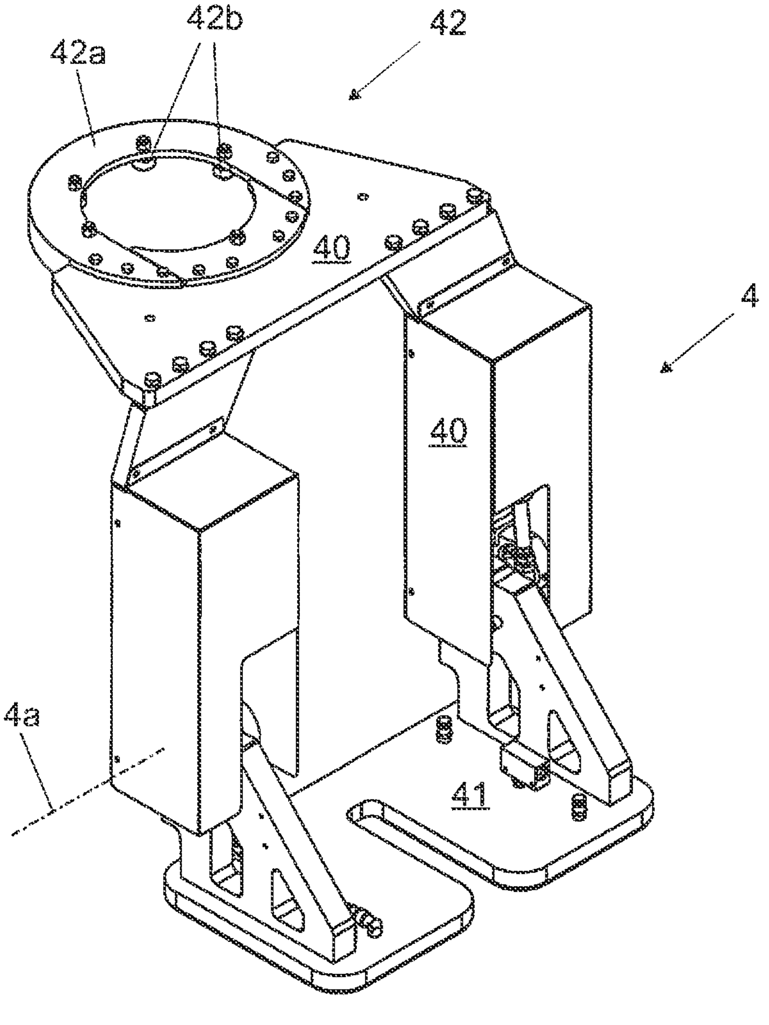
FIG. 4 represents a perspective view from above of the gripping means of a head for bridge processing machines according to the invention.

In this document, measurements, values, shapes and geometric references (such as perpendicularity and parallelism), when associated with words such as "about" or other similar terms such as "practically" or "substantially", are to be understood as such, apart from measurement errors or inaccuracies due to production and/or manufacturing errors and, above all, apart from a slight deviation from the value, measurement, shape or geometric reference with which it is associated. For example, these terms, if associated with a value, preferably indicate a deviation of no more than 10% of the value itself.

Furthermore, when used, terms such as "first", "second", "upper", "lower", "principal" and "secondary" do not necessarily identify a relative order, a priority of relationship or relative position but may simply be used to more clearly distinguish different components from each other.

Unless otherwise specified, as reflected in the following discussions, it is considered that terms such as "processing", "informatics", "determination", "calculation", or the like, refer to the action and/or processes of a computer or similar electronic computing device that handles and/or transforms data represented as physical, such as electronic quantities of registers of a computer system and/or memory, into other data similarly represented as physical quantities within computer systems, registers or other devices for storing, transmitting or displaying information.

The measurements and data reported in this text are to be considered, unless otherwise indicated, as performed in ICAO International Standard Atmosphere (ISO 2533:1975).

Unless otherwise indicated, "perpendicular", "transverse", "parallel" or "normal" or other terms of geometric positioning between geometric elements (for example, axes, directions and straight lines) are to be understood with reference to their mutual geometric position between the corresponding projections. Said projections are defined on a single plane parallel to the plane/s of the arrangement of said geometric elements.

With reference to the Figures, the head for bridge processing machines according to the invention is globally indicated with the number 1.

The head 1 is configured to be mounted on a bridge of a bridge processing machine. The machine may, therefore, comprise a base defining a support surface of the piece and, in particular, of the plate being processed, a head 1 and a bridge configured to move said head with respect to said support surface.

The term head means the set of components configured to move on the bridge integrally with the means intended for processing an object.

The machine may further comprise a unit for controlling the operation of the machine. Said unit can be of a known type.

The base may define a support surface.

The support surface may be substantially horizontal and, in detail, substantially parallel to the ground.

In this document, terms such as vertical and horizontal identify a direction, an axis respectively substantially perpendicular and parallel to the gravitational gradient and preferably to the ground.

The bridge is the portion of the machine that is generally free to translate along a predetermined direction, for example, loosely bound to walls or on bridge or door supports. Also, the bridge is the portion of the machine on which the head is free to move along a direction perpendicular to the direction of movement of the bridge itself. The bridge may comprise a carriage for engaging the head 1; a first beam defining a first sliding axis for the carriage and, therefore, the head 1; and second beams defining a second sliding axis for the first beam and, therefore, the carriage and the head 1, which is substantially perpendicular to said longitudinal axis, and allows the beam and head 1 to be above the supporting surface. The bridge may be of a known type.

The movement of the head 1 vertically, i.e. perpendicular to the ground or to a work table on which the object is positioned, may also be piloted by the bridge itself, or it can be carried out as better explained below.

The object may be a block, a plate, a slab of any material and, more in detail, preferably stone material such as marble, granite or other similar material. Preferably, the object is a plate of preferably stone material. Briefly, the head 1 comprises at least one support 2 and preferably a tool holder assembly 3.

The support 2 is the head part 1 intended to support the processing means (in detail, the tool holder assembly 3 and/or the means intended for handling the object by suitably unloading its weight on the processing machine. It is also the head part 1 in direct contact with the bridge. In detail, it is connectable to the sliding carriage on the first beam.

The support 2, therefore, comprises at least one frame 20.

The frame 20 is configured to be loosely connected to the bridge.

The frame 20 identifies the structural part of the support 2. Therefore, it is a casing or other support structure connectable to the bridge and, in detail, to said carriage. Furthermore, the support 2 may also comprise a shaft 21.

The support 2 may comprise a cover 22 configured to define at least one housing for the shaft portion 21 proximal to the assembly 3.

The cover 22 may be integral with the frame 20, so as to allow at least an unloading of forces between them.

The cover 22 may comprise a plate **22*a* defining an access hole to the shaft 21 and, suitably, a spacer 22*b* of the plate 22*a* from the frame 20. The plate 22*a*** may be annular.

The spacer **22*b* may be a hollow, housing at least one portion of the shaft 21**.

It may be cylindrical.

The plate **22*a* may be integral with the frame 20, and the spacer 22*b* integrally binds the plate 22*a* to the frame 20**.

The shaft 21 may suitably define a rotation axis **2*a*** of the shaft itself and, therefore, of the other components anchored thereto as described below.

The axis of rotation 2*a* is transverse, preferably perpendicular to the direction of movement of the support 2 with respect to the bridge (in detail, to said sliding axes defined by the bridge). Therefore, the axis 2*a* is preferably transverse, more preferably perpendicular, to the ground or to the work table on which the object is arranged (i.e. to the support surface of the base).

The axis of rotation 2*a* may be vertical.

The shaft may be configured to rotate, suitably around the axis 2*a* with respect to the frame 20 and the cover 22.

Furthermore, it can extend along an axis of rotation 2*a*.

The shaft 21 is a movable element with respect to the frame 20. Furthermore, it is at least in part supported by the frame 20.

Furthermore, as previously mentioned, the shaft 21 may be translatable with respect to the frame 20 along the rotation axis 2*a*.

The rotation of the shaft 21 may be motorized. The support 2 may comprise a suitably electric motor for controlling said rotation. The shaft 21 may identify the outlet shaft of a reducer motor.

The tool holder assembly 3 is a device mostly known in the current state of the art. Substantially, the assembly 3 is configured to support at least one tool 30. The tool 30 is the element through which the tool holder assembly 3, and, therefore, the head 1, interacts with the object to process it.

Therefore, the assembly 3 allows processing of the object by means of the tool 30.

The tool may be a tool for removing material from the object and, therefore, for cutting the object itself.

Therefore, it may comprise a cutter, a circular saw, a laser cutting device, or any other device that may allow the cutting, along at least one line, of the object.

The tool holder assembly 3, of course, may comprise first constraint means 31 integral with the tool holder assembly 3 to the shaft 21 which can, therefore, control the rotation of the assembly 3 around the axis 2*a*. The first constraint means 31 may comprise, or consist of, a simple hole, within which the shaft 21 can be engaged. Or, preferably, the first constraint means 31 may comprise a third flange 31*a*.

The third flange 31*a* may be a disc-shaped or circular element, suitably protruding from the casing of the tool holder assembly 3, configured to facilitate the constraint, preferably integral, between the shaft 21 and the assembly 3.

Therefore, the shaft 21 may comprise a first flange 21*a*. The first flange 21*a* may identify the end of the shaft 21 that is proximal to the tool holder assembly 3.

The first flange 21*a* is configured to be constrained in rotation and to be precise, integral with the third flange 21*a*, allowing the shaft 21 to rotate the tool holder assembly 3.

The hole in the plate 22*a* is configured to make the first flange 21*a* accessible to the third flange 31*a*, allowing said constraint between the flanges 21*a* and 31*a*.

The first flange 21*a* is housed in the cover 22 and, in detail, in the spacer 22*b*.

The head 1 may comprise gripping means 4.

The gripping means 4 are configured to interact with the object suitably placed on said support surface, in such a way as to allow the displacement of the object and/or a part thereof suitably along said support surface. Preferably, the means 4 are configured to firmly engage the object in order to be able to position it in a programmed point on the ground or on the work table.

The gripping means 4 may comprise a base portion 40 and at least one gripping device 41.

The base portion 40 is substantially the support portion on which the other elements of the gripping means 4 are constrained. Therefore, it can substantially be made from a support structure or casing.

The gripping device 41 defines a contact surface configured to be placed in contact with object.

The device 41 is configured to engage the object. Therefore, it can be configured to be placed into contact with object itself. In addition, it can comprise a suction cup or, more generally, a gasket defining said contact surface and a closed volume within which the vacuum can be created, thanks, for example, to a pump belonging to the gripping means 4. Of course, the gripping device 41 may be operatively connected, for example, in fluid passage connection, with a pneumatic system. However, these systems are widely known in the current state of the art and are not a particular subject of the present patent application.

The gripping device 41 is movable with respect to the base portion 40. In particular, it is movable in such a way as to define at least two different stable positions: an operative position and a non-operative position.

When in the operative position, preferably, the gripping device 41 may be placed in contact with the object, therefore, engaging the object, for example, by virtue of the contact of the gasket with the object following the creation of the vacuum or a depression within the volume trapped by the gasket.

In the operative position, the contact surface may be substantially perpendicular to the rotation axis 2*a* and, in detail, horizontal.

When in the inoperative position, the gripping device 41 is substantially not in contact with the object, for example, distanced from it.

For example, it can be extracted, with respect to the base portion 40, in the operative position and retracted, with respect to the base portion, in the non-operative position.

In the non-operative position, the contact surface may be substantially parallel to the rotation axis 2*a* and in detail, vertical.

Preferably, the gripping device 41 is rotatable with respect to the base portion 40. In particular, it can be rotated around an operating axis 4*a*.

The operating axis is preferably slanted with respect to the rotation axis 2*a* when the base portion 40 is constrained to the shaft 21.

Furthermore, the operating axis 4*a* extends along a plane perpendicular to the rotation axis 2*a* when the base portion 40 is constrained to the shaft.

The operating axis 4*a* may be parallel to the contact surface.

The operating axis 4*a* may be horizontal.

Advantageously, the head 1 may comprise some important devices.

In fact, the gripping means 4 may comprise second constraint means 42.

The second constraint means 42 are configured to provide a labile constraint between base portion 40 and shaft 21 and, in detail, between gripping means 4 and support 2.

Preferably, said labile constraint allows at least one relative rotation between the base portion 40 (i.e. the gripping means 4) and shaft 21 (i.e. the support 2) suitably around the rotation axis 2*a*. As a result, the entire gripping means 4 may rotate freely around and with respect to the shaft 21, and in detail to the support 2.

More preferably, said labile constraint allows said reciprocal rotation around the rotation axis 2*a*, and a reciprocal translation along the same axis 2*a* between the base 40 (i.e.

the gripping means 4) and shaft 21 (i.e. the support 2). Consequently, the second means 42 are configured to constrain the gripping means 4 to the support 2, blocking their mutual translation in any direction perpendicular to the rotation axis 2*a* and in their reciprocal rotation around axes distinct from the rotation axis 2*a*.

It should be noted that since support 2 and assembly 3 are integral to each other, said labile constraint may enable a translation of the gripping means along the axis 2*a* also with respect to the tool holder assembly 3.

It is highlighted how the second constraint means 42 may be configured to define this labile constraint by unloading at least part (in some cases the totality) of the weight of the gripping means 4 on the support 2 and, in detail, on the frame 20.

To achieve this labile constraint, the second means 42 may comprise a simple annular element (for example a bushing or a bearing) configured to be fitted around the shaft 21, and allowing at least said free rotation between shaft 21 (in detail, the support 2) and gripping means 4.

Alternatively, the second constraint means 42 may comprise a second flange 42*a* suitably integral with the base portion 40; and at least one bearing 42*b* configured to be interposed between second flange 42*a* and shaft 21 and, in detail, between second flange 42*a* and support 2 (in detail the cover 22).

In order to carry out said unloading of the weight of the gripping means 4 onto the support 2, the second flange 42*a* may be configured to rest against the support 2, in detail, on the cover 22 and in more detail on the plate 22*a*. It is highlighted how, as it is resting, it can translate along the axis of rotation 2*a*, for example, by moving away from it.

It is highlighted that the stroke of said translation between the support 2 and the gripping means 4 along the axis 2*a* may be substantially proportional to the distance along the axis 2*a* between the plate 22*a* and the frame 20, suitably subtracted from the height of the second flange 42*a* along the axis 2*a*.

Furthermore, the second flange 42*a* may define a housing for the spacer 22*b* and, in detail, a housing with a larger diameter than the spacer 22*b*, in such a way that the constraint between the gripping means 4 and the support 2 does not interfere with the constraint between the tool holder assembly 3 and the shaft 21.

The bearing 42*b* is configured to be interposed between second flange 42*a* and cover 22 and, in detail, between second flange 42*a* and spacer 22*b*.

The bearing 42*b* is substantially an element per se known, for example, a rolling bearing, at least in part connected to the second flange 42*a*, and at least in part connected to the base portion 40, in such a way as to allow their reciprocal rotation around the rotation axis 2*a*. In some cases, the second constraint means 42 may comprise a plurality of bearings 42*b*, each of which define a rolling element configured to contact the spacer 22*b*.

The second constraint means 42 may comprise at least one regulator 42*c* of the position of the gripping means 4 with respect to the tool holder assembly 3 along the rotation axis 2*a*.

The regulator 42*c* may be interposed between the second flange 42*a* and assembly 3.

It may comprise a known adjustment screw/bolt.

Advantageously, in addition to what has been described, the gripping means 4 and the tool holder assembly 3 may comprise interface means 5.

The interface means 5 are substantially interconnection elements between the gripping means 4 and the tool holder assembly 3.

Therefore, the gripping means 4 and the tool holder assembly 3 are configured to be mutually coupled, and the invention may also comprise gripping means 4 and a tool holder assembly 3 when the latter are provided with interface means 5.

The interface means 5, in detail, are configured to block at least (preferably exclusively) the reciprocal rotation between the tool holder assembly 3 and the base portion 40. In this way, the tool holder assembly 3 may drag the gripping means 4 when rotated around the rotation axis 2*a*.

In even more detail, the interface means 5 may be made in different ways, distinct or combined with each other.

For example, the interface means 5 may comprise hooks or obstruction elements configured to allow the transmission of the motion from the tool holder assembly to the gripping means 4.

Furthermore, the interface means 5 may comprise at least one first wall 50 and one second wall 51. The first wall 50 is substantially part of the tool holder assembly 3. For example, it is a wall of the casing of the tool holder assembly 3.

The second wall 51 is preferably part of the base portion 40. Preferably, the second wall 51 is a wall arranged on a side opposite to the side on which the gripping device 41 is positioned.

Furthermore, the second wall 51 is preferably counter-shaped to the first wall 50. Therefore, the second wall 51 is configured to contact the first wall 50 when the tool holder 3 and the base portion 40 are constrained to the support 2, as described above. To ensure that the tool holder assembly and the base portion 40 do not rotate reciprocally, it is sufficient that the walls 50, 51 are flat and resting along a plane that is not perpendicular to the rotation axis 2*a* and, preferably, parallel to the rotation axis 2*a* or even slightly transverse.

Alternatively, it may also be envisaged that the walls 50, 51 interpenetrate, similarly to that between a male plug and a female socket, in order to be able to engage.

The interference means 5, in fact, may alternatively or further comprise other components. For example, the interference means 5 may comprise at least one limiter configured to limit (in some cases prevent) the translation of the gripping means 4 along a plane parallel to the rotation axis 2*a* and, in detail, along the axis 2*a*.

The limiter limits and optionally prevents a translation of the gripping means 4 with respect to the support 2. In detail, it may be configured to limit (in some cases prevent) the reciprocal translation between the gripping means 4 and the tool holder assembly 3 when the assembly 3 and the base portion 40 are constrained to the support 2.

The limiter may be interposed between the walls 50, 51.

It may comprise a protruding element 52 transversely and, in detail, normally to the rotation axis 2*a* and a housing 53 of said protruding element 52.

The protruding element 52 may be integral with either the tool holder 3 or the gripping means 4; with the housing 53 being integral with the other, either the tool holder 3 or the gripping means 4. Preferably the element 52 may be on the tool holder assembly 3 and, to be precise, on the first wall 50; the housing 53 may be integral with the gripping means 4, in detail, with the base portion 40 and in greater detail with the second wall 51.

The protruding element 52 may be at least partially inserted in the housing 53 so as to slide freely in it for the length of the housing 53 along the rotation axis 2*a*.

Said length of the housing 53, being calculated along the axis 2*a*, is at least equal to the stroke of the reciprocal translation between gripping means 4 and support 2 and, therefore, between means 4 and assembly 3.

Finally, the head 1 may comprise a stop 6 sensor configured to identify a stop of the translation between support 2 and gripping means 4 along the rotation axis 2*a*.

The stop 6 is configured to substantially identify a contact between frame 20 and gripping means 4 given by a reciprocal translation between support 2 and gripping means along the axis 2*a*. In detail, it may be configured to detect the contact between said second flange 42*a* and frame 20. It may comprise a pressure sensor.

The stop 6 may be part of the support 2 and, in detail, integrated into the cover 22 and to be precise in the plate 22*a* or in the spacer 22*b*. Alternatively, it may be part of the gripping means 4 and, in detail, integrated in the second constraint means 42 and, more precisely, in the second flange 42*a*.

The stop 6 may be in data connection with the control unit so as to allow said unit to control the stop of the machine when the stop 6 detects a contact between frame 20 and gripping means 4.

The operation of the head 1 for bridge processing machines previously described in structural terms is as follows.

When a rotation or translation movement of the shaft 21 is imposed around or along the rotation axis 2*a*, the shaft 21 moves the tool holder assembly 3. The latter, by virtue of the interface means 5, drags the movement of the gripping means 4 which, therefore, do not require actuators or other movement mechanisms dedicated to them. It is highlighted that in the absence of the interface means 5, the second constraint means 42 would cause the gripping means 4 to remain rotationally stationary.

Of course, the invention was described by omitting the descriptions relating to the various moving members, as well as the pneumatic system, and the control system since all these elements are widely known in the current state of the art.

The invention also comprises a new method for assembling a head for a bridge processing machine.

In particular, the method is carried out with the head 1.

The method may substantially comprise at least one first constraint step wherein the base portion 40 and the shaft 21 are mutually constrained, allowing at least one reciprocal rotation thereof.

In detail, in the first constraint step, the base portion 40 (and to be precise, the gripping means 4) are constrained to the support 2 allowing their reciprocal rotation. More in detail, in this first constraint step, the base portion 40 and, therefore, the gripping means 4 are loosely constrained to the shaft 21 and, in detail, to the support 2, allowing both their reciprocal rotation around the rotation axis 2*a* and their reciprocal translation 21 along the axis 2*a*.

In the first step, the second flange 42*a* is placed resting against the cover 22 and in greater detail against the plate 22*a*, and the at least one bearing 42*b* is interposed between the second flange 42*a* and the cover 22, and in greater detail between the second flange 42*a* and the spacer 42*b*.

The method advantageously also includes a second constraint step wherein the tool holder assembly 3 is constrained to the said shaft 21 in such a way that the interface means 5 block at least the reciprocal rotation between the tool holder assembly 3 and the base portion 40.

It is noted that at the end of the method, the second flange 42*a* rests against the cover 22 and in more detail on the plate 22*a*. It is, therefore, not in contact with the frame 20 and to be precise, it is spaced apart from it along the translation axis 2*a*. Consequently, the gripping means 4, when gripping an object, may compensate for an error (for example, a displacement or incorrect thickness of the object) by translating along the axis of rotation 2*a* with respect to the support 2 and the assembly 3.

The head 1 for a bridge processing machine according to the invention achieves important advantages.

In fact, the head 1 for a bridge processing machine allows reduction of the complexity of the machine, since it does not require a plurality of independent moving members for the gripping means 4 and the tool holder assembly 3, or rather, the processing means.

Furthermore, the head 1 for a bridge processing machine allows the use, in the face of reduced complexity, of the gripping means 4 and the tool 3 of the tool holder assembly 3 simultaneously, since the position of the gripping device 41 is completely independent from the tool position 30.

Furthermore, the head 1 allows reduction of the number of components involved in moving, when movement of the object is required with respect to the processing surface or table.

Other advantages given, in particular, by the particular constraint between the support 2, tool holder assembly 3 and gripping means 4, are given by the particular unloading of the weight of the gripping means 4 carried out on the frame 20 and, therefore, not on the rotation members (the shaft 21) thus reducing wear and risk of faults.

A not secondary advantage lies in the fact that the gripping device 41, by overturning and, to be precise, arranging itself vertically when not in use vertically, allows the release by gravity of debris and dirt, which would otherwise degrade the gripping device. Moreover, this particular positioning of the gripping device 41 when not in use reduces the overall dimensions of the head 1 and, therefore, increases its maneuverability.

The invention is susceptible to variants falling within the scope of the inventive concept defined by the claims.

For example, as widely known, other degrees of freedom may be introduced between shaft 21 and frame 20, for example, rotations around different axes with respect to the rotation axis 2*a*.

In this context, all the details can be replaced by equivalent elements and the materials, shapes and dimensions may be any.

The invention claimed is:

1. A head for a bridge processing machine, comprising:

a support comprising a frame configured to be loosely connected to a bridge and a shaft defining an axis of rotation and at least rotatable with respect to said frame around said axis of rotation, a tool holder assembly configured to support at least one tool so as to allow processing of an object by means of said at least one tool and comprising first constraint means configured to integrally constrain said tool holder assembly and said shaft, and gripping means comprising a base portion and at least one gripping device movable with respect to said base portion so as to define at least one operative position wherein it engages an object, and one non-operative position, wherein said gripping means further comprises second constraint means configured to constrain said base portion and said shaft allowing a reciprocal rotation between said base portion and said shaft with respect to said axis of rotation, and wherein said gripping means and said tool holder assembly comprise interface means configured to block at least reciprocal rotation between said tool holder assembly and said base portion so that said tool holder assembly may drag said gripping means when rotated around said axis of rotation.

2. The head according to claim 1, wherein said second constraint means are configured to unload at least part of a weight of the gripping means onto said frame.

3. The head according to claim 1, wherein:

said shaft comprises a first flange at a free end;

said tool holder assembly comprises a third flange configured to be constrained in rotation to said first flange;

said support comprises a plate defining an access hole to said shaft and a spacer of said plate from said frame;

said hole of said plate is configured to make said first flange accessible to said third flange; and said second constraint means comprise a second flange configured to rest on said plate and a bearing interposed between said second flange and said spacer.

4. The head according to claim 3, further comprising a stop configured to detect contact between said second flange and said frame.

5. The head according to claim 1, wherein said interface means comprise at least one first wall part of said tool holder assembly and a second wall part of said base portion, the second wall part being counter-shaped to said at least one first wall and configured to come into contact with said at least one first wall when said tool holder assembly and said base portion are constrained to said shaft.

6. The head according to claim 1, wherein said interface means comprise at least one limiter of the reciprocal translation between said tool holder assembly and said gripping means along said axis of rotation when said tool holder assembly and said base portion are constrained to said shaft.

7. The head according to claim 1, wherein said at least one gripping device is rotatable with respect to said base portion around an operating axis slanted with respect to said axis of rotation and extending along a plane perpendicular to said axis of rotation when said base portion is constrained to said shaft.

8. A method for assembling the head for the bridge processing machine according to claim 1, the method comprising:

constraining said base portion and said shaft allowing a reciprocal rotation between said base portion and said shaft with respect to said rotation axis of rotation, and constraining said tool holder assembly to said shaft in such a way that said interface means block at least the reciprocal rotation between said tool holder assembly and said base portion.

* * * * *